United States Patent
Jang et al.

(10) Patent No.: US 6,405,095 B1
(45) Date of Patent: Jun. 11, 2002

(54) RAPID PROTOTYPING AND TOOLING SYSTEM

(75) Inventors: Borzeng Jang, Auburn, AL (US); Jun Duan, Beijing (CN); Kerbin Chen, Beijing (CN); Xin Lu, Beijing (CN); Erjian Ma, Auburn, AL (US)

(73) Assignee: Nanotek Instruments, Inc., Opelika, AL (US)

( * ) Notice: Subject to any disclaimer, the term of this patent is extended or adjusted under 35 U.S.C. 154(b) by 0 days.

(21) Appl. No.: 09/318,779

(22) Filed: May 25, 1999

(51) Int. Cl.$^7$ .................................. G06F 19/00
(52) U.S. Cl. ................ 700/118; 700/97; 700/98; 700/117; 700/119; 700/163; 345/419; 345/420; 264/75; 264/401; 264/633; 264/642; 264/308; 427/466; 427/472; 427/470
(58) Field of Search .................. 700/97, 98, 117, 700/118, 119, 163; 345/419, 420; 264/75, 401, 308, 633, 642; 427/466, 472, 470

(56) References Cited

U.S. PATENT DOCUMENTS

| | | |
|---|---|---|
| 4,665,492 A | 5/1987 | Masters |
| 4,749,347 A | 6/1988 | Valvaara |
| 4,863,538 A | 9/1989 | Deckard |
| 5,059,266 A | 10/1991 | Yamane et al. |
| 5,121,329 A | 6/1992 | Crump |
| 5,126,529 A | 6/1992 | Weiss et al. |
| 5,134,569 A | 7/1992 | Masters |
| 5,136,515 A | 8/1992 | Helinski |
| 5,140,937 A | 8/1992 | Yamane et al. |
| 5,171,360 A | 12/1992 | Orme et al. |
| 5,204,055 A | 4/1993 | Sachs et al. |
| 5,207,371 A | 5/1993 | Prinz et al. |
| 5,216,616 A | 6/1993 | Masters |
| 5,226,948 A | 7/1993 | Orme et al. |
| 5,257,657 A | 11/1993 | Gore |
| 5,259,593 A | 11/1993 | Orme et al. |
| 5,281,789 A | 1/1994 | Merz et al. |
| 5,301,415 A | 4/1994 | Prinz et al. |
| 5,301,863 A | 4/1994 | Prinz et al. |
| 5,303,141 A | 4/1994 | Batchelder |
| 5,340,090 A | 8/1994 | Orme et al. |
| 5,340,656 A | 8/1994 | Sachs et al. |
| 5,387,380 A | 2/1995 | Cima et al. |
| 5,398,193 A | 3/1995 | de Angelis |
| 5,402,351 A | 3/1995 | Batchelder |
| 5,490,882 A | 2/1996 | Sachs et al. |
| 5,514,232 A | 5/1996 | Burns |
| 5,555,176 A | 9/1996 | Menhennett |
| 5,555,481 A | 9/1996 | Roch et al. |
| 5,578,227 A | 11/1996 | Rabinovich |
| 5,617,911 A | 4/1997 | Sterett et al. |
| 5,669,433 A | 9/1997 | Sterett et al. |
| 5,718,951 A | 2/1998 | Sterett et al. |
| 5,738,817 A | 4/1998 | Danforth et al. |
| 5,746,844 A | 5/1998 | Sterett et al. |

*Primary Examiner*—Ramesh Patel

(57) ABSTRACT

A solid freeform fabrication process and apparatus for making a three-dimensional object. The process comprises the steps of (1) operating a material deposition sub-system for dispensing droplets of solidifiable liquid compositions on demand onto selected spots of an object work surface, for using a focused heat source to maintain a heat-affected zone on the work surface, and for creating a weld pool of molten materials on this work surface by injecting selected powder particles into this heat-affected zone and (2) during the material deposition process, moving the deposition sub-system and the work surface relative to each other in an X-Y plane defined by first and second directions and in a Z direction orthogonal to the X-Y plane so that the materials are deposited to form a first layer of the object. The material in the weld pool solidifies after the heat-affected zone moves away to build portions of a layer. These steps are repeated to deposit multiple layers for forming a three-dimensional shape. Preferably, the peripheral areas and the staircase step zones between layers are built with fine droplets for improved part accuracy while the bulk of the object is built with solidification of weld pool materials. These steps are preferably executed under the control of a computer system. Preferably, the system is also operated to generate a support structure for any un-supported feature of the object.

28 Claims, 9 Drawing Sheets

RAPID PROTOTYPING AND TOOLING SYSTEM

FIELD OF THE INVENTION

This invention relates generally to a computer-controlled object-building system and, in particular, to an improved solid freeform fabrication system for building a three-dimensional object such as a model or a molding tool.

BACKGROUND OF THE INVENTION

Solid freeform fabrication (SFF) or layer manufacturing is a new rapid prototyping and tooling technology. A SFF system builds an object layer by layer or point by point under the control of a computer. The process begins with creating a Computer-Aided Design (CAD) file to represent the desired object. This CAD file is converted to a suitable format, e.g. stereo lithography (.STL) format, and further sliced into a large number of thin layers with the contours of each layer being defined by a plurality of line segments connected to form vectors or polylines. The layer data are converted to tool path data normally in terms of computer numerical control (CNC) codes such as G-codes and M-codes. These codes are then utilized to drive a fabrication tool for building an object layer by layer.

The SFF technology has found a broad range of applications such as verifying CAD database, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, and providing small production runs. Although most of the prior-art SFF techniques are capable of making 3-D form models of relatively weak strength, few are able to directly produce material processing tools (such as molds for injection molding) with adequate accuracy and good speed.

A commercially available system, fused deposition modeling (FDM) from Stratasys, Inc. (Minneapolis, Minn.), operates by employing a heated nozzle to melt and extrude out a nylon wire or wax rod. The nozzle is translated under the control of a computer system in accordance with previously sliced CAD data. The FDM technique was first disclosed in U.S. Pat. No. 5,121,329 (1992), issued to Crump. This process requires preparation of a raw material into a flexible filament or a rigid rod form and, in real practice, has met with difficulty in extruding high temperature metal or ceramic materials. A more recent patent (U.S. Pat. No. 5,738,817, April 1998, to Danforth, et al.) reveals a FDM process for forming 3-D objects from a mixture of a particulate composition dispersed in a binder. The binder is later burned off with the remaining particulate composition densified by either metal impregnation or high-temperature sintering. Other melt extrusion-type processes include those disclosed in Valavaara (U.S. Pat. No. 4,749,347, June 1988), Masters (U.S. Pat. No. 5,134,569, July 1992), and Batchelder, et al. (U.S. Pat. No. 5,402,351, 1995 and U.S. Pat. No. 5,303,141, 1994). These melt extrusion based deposition systems are known to provide a relatively poor part accuracy. For instance, a typical FDM system provides an extruded strand of 250 to 500 $\mu$m, although a layer accuracy as low as 125 $\mu$m is achievable. The accuracy of a melt extrusion rapid prototyping system is limited by the orifice size of the extrusion nozzle, which cannot be smaller than approximately 125 $\mu$m in real practice. Otherwise, there would be excessively high flow resistance in an ultra-fine capillary channel.

In U.S. Pat. No. 4,665,492, issued May 12, 1987, Masters teaches part fabrication by spraying liquid resin droplets, a process commonly referred to as Ballistic Particle Modeling (BPM). The BPM process includes heating a supply of thermoplastic resin to above its melting point and pumping the liquid resin to a nozzle, which ejects small liquid droplets from different directions to deposit on a substrate. Patents related to the BPM technology can also be found in U.S. Pat. No. 5,216,616 (June 1993 to Masters), U.S. Pat. No. 5,555,176 (September 1996, Menhennett, et al.), and U.S. Pat. No. 5,257,657 (November 1993 to Gore). Sanders Prototype, Inc. (Merrimack, N.H.) provides inkjet print-head technology for making plastic or wax models. Multiple-inkjet based rapid prototyping systems for making wax or plastic models are available from 3D Systems, Inc. (Valencia, Calif.). Model making from curable resins using an inkjet print-head is disclosed by Yamane, et al. (U.S. Pat. No. 5,059,266, October 1991 and U.S. Pat. No. 5,140937, August 1992) and by Helinski (U.S. Pat. No. 5,136,515, August 1992). Inkjet printing involves ejecting fine polymer or wax droplets from a print-head nozzle that is either thermally activated or piezo-electrically activated. The droplet size typically lies between 30 and 50 $\mu$m, but could go down to 13 $\mu$m. This implies that inkjet printing offers a high part accuracy. However, building an object point-by-point with "points" or droplets as small as 13 $\mu$m could mean a slow build rate.

In a series of U.S. Pat. (No. 5,204,055, April 1993, U.S. Pat. No. 5,340,656, August 1994, U.S. Pat. No. 5,387,380, February 1995, and U.S. Pat. No. 5,490,882, February 1996), Sachs, et al. disclose a 3-D printing technique that involves using an ink jet to spray a computer-defined pattern of liquid binder onto a layer of uniform-composition powder. The binder serves to bond together those powder particles on those areas defined by this pattern. Those powder particles in the "negative" regions (without binder) remain loose or separated from one another and are removed at the end of the build process. Another layer of powder is spread over the preceding one, and the process is repeated. The "green" part made up of those bonded powder particles is separated from the loose powder when the process is completed. This procedure is followed by binder removal and metal melt impregnation or sintering. Again, ejection of fine liquid droplets to bond a large area of powder particles could mean a long layer-building time. Additionally, it is difficult to entirely remove the polymer binder material from the finished 3-D object. The presence of binder residue could reduce the strength and other desired properties of the object. The metal melt impregnation process results in a honey-comb type structure of less than desirable properties and subjects this structure to creeping or warping during sintering of the original host material. The selected laser sintering or SLS technique (e.g., U.S. Pat. No. 4,863,538) involves spreading a full-layer of powder particles and uses a computer-controlled, high-power laser to partially melt these particles at desired spots. Commonly used powders include thermoplastic particles or thermoplastic-coated metal and ceramic particles. The procedures are repeated for subsequent layers, one layer at a time, according to the CAD data of the sliced-part geometry. The loose powder particles in each layer are allowed to stay as part of a support structure. The sintering process does not always fully melt the powder, but allows molten material to bridge between particles. Commercially available systems based on SLS are known to have several drawbacks. One problem is that long times are required to heat up and cool down the material chamber after building. In addition, the resulting part has a porous structure and subsequent sintering or infiltration operations are needed to fully consolidate the part.

In U.S. Pat. No. 5,555,481 (September 1996) Rock and Gilman disclose a freeform powder molding (FPM) method. A first class material and a second class material are deposited on a surface wherein the first class material forms a 3-D shape defined by the interface between the first class material and the second class material. The first class material is unified by subsequent processing such as sintering or fusion-and-solidification, which is followed by removing the second class material from the 3-D part made up of first class material. The second class material plays the basic role of serving as a support structure. Upon completion of the deposition procedure for all layers, the green object which has been compacted but not yet unified is highly delicate and fragile, prone to shape changes during subsequent handling. The final unification procedure tends to involve dimensional or shape changes in a part, thereby compromising the part accuracy. For instance, sintering of ceramic or metallic particles is known in the field of powder technology to involve large shrinkage. Solidification of a crystalline material (polymer, metal, and ceramic) from the melt state to the solid state are normally attendant with a large volume change. Since these geometry changes are allowed to occur at the end of the part building process, it is extremely difficult to exercise any corrective action to ensure the part accuracy.

In U.S. Pat. No. 5,514,232 (May 1996), Burns discloses a method and apparatus for automatic fabrication of a 3-D object from individual layers of fabrication material having a predetermined configuration. Each layer of fabrication material is first deposited on a carrier substrate in a deposition station. The fabrication material along with the substrate are then transferred to a stacker station. At this stacker station the individual layers are stacked together, with successive layers being affixed to each other and the substrate being removed after affixation. One advantage of this method is that the deposition station may permit deposition of layers with variable colors or material compositions. In real practice, however, transferring a delicate, not fully consolidated layer from one station to another would tend to shift the layer position and distort the layer shape. The removal of individual layers from their substrate also tends to inflict changes in layer shape and position with respect to a previous layer, leading to inaccuracy in the resulting part. It is difficult to use this process for fabricating metal parts; additional fusion, sintering, or diffusion bonding treatments are required to affix layers together.

In U.S. Pat. No. 5,301,863 (Apr. 12, 1994), Prinz and Weiss disclose a Shape Deposition Manufacturing (SDM) system. The system contains a material deposition station and a plurality of processing stations (for mask making, heat treating, packaging, complementary material deposition, shot peening, cleaning, shaping, sand-blasting, and inspection). Each processing station performs a separate function such that when the functions are performed in series, a layer of an object is produced and is prepared for the deposition of the next layer. This system requires an article transfer apparatus, a robot arm, to repetitively move the object-supporting platform and any layers formed thereon out of the deposition station into one or more of the processing stations before returning to the deposition station for building the next layer. These additional operations in the processing stations tend to shift the relative position of the object with respect to the object platform. Further, the transfer apparatus may not precisely bring the object to its exact previous position. Hence, the subsequent layer may be deposited on an incorrect spot, thereby compromising part accuracy. The more processing stations that the growing object has to go through, the higher the chances are for the part accuracy to be lost. Such a complex and complicated process necessarily makes the over-all fabrication equipment bulky, heavy, expensive, and difficult to maintain. The equipment also requires attended operation. Earlier patents related to SDM include U.S. Pat. No. 5,126,529 (June 1992), U.S. Pat. No. 5,207,371 (May 1993), and U.S. Pat. No. 5,301,415 (April 1994), all issued to Prinz, et al.

There are other methods that also make use of the approach of combined layer-addition and layer-subtraction: e.g., U.S. Pat. No. 5,398,193, March 1995 to deAngelis. These methods use metal deposition in conjunction with a metal removal technique such as milling, grinding, and the like. The "staircase effect" and the roughness at the edge of each layer are reduced or eliminated by machining each layer and its peripheries after the layer is deposited.

Methods that involve deposition of metal parts from a steam of liquid metal droplets are disclosed in Orme, et al (U.S. Pat. Nos. 5,171,360; 5,226,948; 5,259,593; and 5,340,090) and in Sterett, et al. (U.S. Pat. Nos. 5,617,911; 5,669,433; 5,718,951; and 5,746,844). The method of Orme, et al involves directing a stream of a liquid material onto a collector of the shape of the desired product. A time dependent modulated disturbance is applied to the stream to produce a liquid droplet stream with the droplets impinging upon the collector and solidifying into a unitary shape. The method of Sterett, et al entails providing a supply of liquid metal droplets with each droplet being endowed with a positive or negative charge. The steam of liquid droplets is focused by passing these charged droplets through an alignment means, e.g., an electric field, to deposit on a target in a predetermined pattern. The deflection of heavy droplets of liquid metal by an electric field is not easy to accomplish. Further, a continuous supply of liquid metal droplets may make it difficult to prevent droplets from reaching "negative" regions (which are not portions of a cross-section of the object). A mask will have to be used to collect these unwanted droplets.

A welding-type SFF method is disclosed in U.S. Pat. No. 5,578,227 issued in November 1996 to Rabinovich. This method involves directing a laser beam toward a rectilinearly movable stage for fusing a rectangular wire to a substrate or a previously fused wire layer on the stage. The wire is driven from a spool through a nozzle to be laid flat near a focused spot of the laser beam. Movement of the movable stage is controlled by a computer and stepper motors to follow a predetermined pattern of a cross-section of the desired object. In the welding process described in U.S. Pat. No. 5,281,789 (January 1994 to Merz, et al), a molten metal is deposited on a work surface and subsequent layers of metal are deposited thereon. An electrode and a weld torch are moved as a unit so that the molten metal may be deposited onto selective locations on the work surface. The droplet size is controlled by applying additional mechanical energy to the feed wire to constantly vibrate the feed metal. This is not a reliable mechanism for precise control of the droplet size. Both methods, specified in '227 and '789, do not readily permit variations in material composition. The weld pool size in these processes is too large to provide adequate part accuracy.

Another welding-type SFF process was developed by the researchers at Sandia National Labs. This process, laser-engineered net shaping (LENS), can make 3-D metallic components directly from CAD models. The LENS process entails injecting metal powder into a pool of molten metal created by a focused laser beam as the substrate below is slowly moved to trace out the contours of an object layer-by-layer. This process has been utilized to fabricate parts from a variety of metals, including 316 stainless steel, H13 tool steel, Inconel 625, tungsten, Ti-6Al-4V, nickel aluminide, and others. This process melts metallic powders completely and produces a fully dense material that does not require post-fabrication operations such as sintering. Again, it is difficult to maintain a weld pool smaller than 0.02 inch (0.5 mm or 500 $\mu$m) in diameter; thus resulting in a Z-axis accuracy of no better than 250–350 $\mu$m.

Most of the prior-art layer manufacturing techniques have been largely limited to producing parts with homogeneous material compositions. Furthermore, due to the specific solidification mechanisms employed, many other techniques are limited to producing parts from specific polymers. For instance, Stereo Lithography and Solid Ground Curing (SGC) rely on ultraviolet (UV) light induced curing of photo-curable polymers such as acrylate and epoxy resins. Polymers do not have adequate strength and thermal stability for use as tooling materials. As indicated earlier, droplet deposition, melt extrusion, or welding-type method alone does not meet the two critical requirements imposed upon a rapid prototyping (RP) or rapid tooling (RT) system: speed and accuracy. For instance, liquid droplet ejection features high accuracy but low speed, while melt extrusion or welding features relatively higher speed but much lower accuracy. Additionally, all layer-additive techniques produce parts with a "staircase" appearance (see FIG.6a), which compromises the part accuracy.

Therefore, an object of the present invention is to provide an improved layer-additive process and apparatus for producing an object with high build rate and part accuracy.

Another object of the present invention is to provide a computer-controlled process and apparatus for producing a multi-material 3-D object on a layer-by-layer basis.

It is a further object of this invention to provide a computer-controlled object-building process that does not require heavy and expensive equipment.

It is another object of this invention to provide a process and apparatus for building a CAD-defined object in which the material composition distribution can be predetermined.

Still another object of this invention is to provide a layer manufacturing technique that places minimal constraint on the range of materials that can be used in the fabrication of a 3-D object.

SUMMARY OF THE INVENTION

The Process

The objects of the invention are realized by a process and related apparatus for fabricating a three-dimensional object on a layer-by-layer basis. Basically, the process comprises providing a focused heat source to maintain a small pool of molten material on the surface of a movable stage. The material in this pool is replenished, continuously or intermittently, by injecting metal and/or ceramic powder into this pool. The stage is controlled to move relative to the heat source to trace out the geometry of a bulky portion of a first layer for the desired object. The "scanning" of this pool (heat source-powder interaction zone) leaves behind a strand of molten material which substantially solidifies immediately after the material moves out of the heat-affected zone. Other portions of an object, particularly those containing fine features of a layer, are built by ejecting and depositing fine liquid droplets for improved accuracy. These two procedures are repeated concurrently or sequentially under the control of a CAD computer to deposit consecutive layers in sequence, thereby forming the desired 3-D object. The preferred heat source is a laser beam. Both liquid droplets and melt pool material compositions can be selected from a wide range of materials. Preferably, fine droplets of solidifiable liquid compositions are deposited to form a gradient-thickness zone to reduce or eliminate the staircase effect near any exterior peripheral zone.

Specifically, in one embodiment, the process comprises the steps of:

(a) operating a material deposition sub-system above a work surface with this sub-system comprising (1) a multiple-channel droplet deposition device for supplying multiple liquid compositions and ejecting droplets of selected liquid compositions on demand, (2) a focused heat source such as a laser beam that produces a heat-affected zone on the work surface, and (3) a powder dispensing device to inject fine solid particles into the heat-affected zone for maintaining a pool of molten material on the work surface;

(b) during the droplet ejecting and powder dispensing process, moving the material deposition sub-system and the work surface relative to one another in an X-Y plane defined by first (X-) and second (Y-) directions and in a third or Z-direction orthogonal to the X-Y plane to form the liquid droplets and melt pool material (collectively referred to as deposition materials) into a three dimensional object. Preferably, the weld pool is used to build the bulk of the object while the fine ejected droplets are used to build peripheries to reduce the "staircase effect" or other regions containing fine features. Different liquid channels may supply different liquid compositions; e.g., different types of material and/or different additives. The powder dispensing device preferably is also capable of supplying powder particles of variable compositions.

Preferably, the above-cited moving step includes the steps of (i) moving the deposition sub-system and the work surface relative to each other in a direction parallel to the X-Y plane to form a first layer of the deposition materials on the work surface; (ii) moving the deposition subsystem and the work surface away from one another by a predetermined layer thickness; and (iii) after the portion of the first layer adjacent to the nozzles of the deposition sub-system has substantially solidified, dispensing a second layer of the deposition materials onto the first layer while simultaneously moving the work surface and the deposition sub-system relative to each other in a direction parallel to the X-Y plane, whereby the deposition materials in the second layer solidify and adhere to the first layer.

Preferably, the above steps are followed by additional steps of forming multiple layers of the deposition materials on top of one another by repeated dispensing of the liquid droplets and powder particles from the deposition devices as the work surface and the deposition sub-system are moved relative to each other in a direction parallel to the X-Y plane, with the deposition sub-system and the work surface being moved away from one another in the Z-direction by a predetermined layer thickness after each preceding layer has been formed, and with the deposition of each successive layer being controlled to take place after the deposition materials in the preceding layer immediately adjacent the deposition sub-system have substantially solidified.

Further preferably, the above cited steps are executed under the control of a computer by taking the following procedures: (f) creating an image of the three-dimensional object on a computer with the image including a plurality of segments defining the object; (g) generating programmed signals corresponding to each of the segments in a predetermined sequence; and (h) moving the deposition sub-system and the work surface relative to each other in response to the programmed signals. To build a multi-material object, each segment is preferably attached with a material composition code that can be converted to programmed signals for activating the ejection of selected liquid compositions and dispensing selected powder compositions to form a desired material distribution of the finished object. Further preferably, the supporting software programs in the computer comprise means for evaluating the CAD data files of the object to locate any un-supported feature of the object and means for defining a support structure for the un-supported feature. The software is also capable of creating a plurality of segments defining the support structure and generating programmed signals required by a deposition channel to fabricate the support structure.

The above-cited multiple-channel liquid droplet deposition device may simply be embodied by a plurality of separate droplet deposition devices with each device being supplied with possibly different liquid compositions and being capable of ejecting the liquid compositions in the form of droplets on demand. At least one device or channel is employed to deposit droplets of an object-building material while a second device is used for depositing a support structure.

The Apparatus

One embodiment of this invention is an apparatus comprising a material deposition sub-system, a work surface, and motion devices. The material deposition sub-system is composed of three major components: a liquid droplet deposition device, a focused heat source (a laser beam, e.g.), and a powder-dispensing device. The liquid droplet deposition device comprises (1) a multiplicity of flow channels with each channel being supplied with a solidifiable liquid composition, (2) at least one nozzle having a fluid passage in flow communication with one corresponding channel and a discharge orifice, and (3) actuator means located in control relation to these channels for activating droplet ejection through these discharge orifices. The focused heat source, disposed in working proximity to the work surface, creates a small heat-affected zone on the work surface. The powder-dispensing device comprises (1) at least a flow channel being supplied with solid powder particles, (2) a nozzle having a flow passage in flow communication with the flow channel and a discharge orifice, and (3) valve means located in control relation with the corresponding flow channel. The discharge orifice is disposed above the work surface but in the vicinity of the heat affected zone in such a fashion that the powder particles are discharged to this zone for forming a molten material pool of a predetermined size. The valve means operate to supply a metered amount of powders of predetermined material compositions, continuously or intermittently, to maintain a substantially constant-sized pool of molten material.

The work surface is generally flat and is located in close, working proximity to the discharge orifices of the deposition sub-system to receive discharged materials therefrom. The motion devices are coupled to the work surface and the material deposition sub-system for moving the deposition sub-system and the work surface relative to one another in the X-Y plane and in the Z-direction. Preferably, the liquid droplet device and the powder dispensing device are attached together to move as an integral unit. The motion devices are preferably controlled by a computer system for positioning the deposition sub-system with respect to the work surface in accordance with a CAD-generated data file representing the object. Further preferably, the same computer is used to regulate the operations of the material deposition sub-system in such a fashion that liquid droplets and powder particles are dispensed in predetermined sequences and at predetermined proportions.

The work surface is preferably provided with a controlled atmosphere wherein the temperature, pressure (including vacuum conditions), and gas composition can be regulated to facilitate solidification and to protect against possible metal oxidation. Preferably, sensor means are provided to periodically measure the dimensions of an object being built and send the acquired dimension data to the CAD computer so that new sets of logical layers may be re-calculated when necessary.

The droplet deposition device may be made to be similar to a multi-channel print-head commonly used in an ink jet printer. The print-head is equipped with heating means to maintain the material in a liquid state. Ink jet print-heads can generally be divided into two types: one type using thermal energy to produce a vapor bubble in an ink-filled channel that expels a drop of liquid while a second type using a piezoelectric transducer to produce a pressure pulse that expels a droplet from a nozzle. Droplets are dispensed through an orifice to deposit onto predetermined regions of a surface upon which a layer is being built.

Advantages of the Invention

The process and apparatus of this invention have several features, no single one of which is solely responsible for its desirable attributes. Without limiting the scope of this invention as expressed by the claims which follow, its more prominent features will now be discussed briefly.

After considering this brief discussion, and particularly after reading the section entitled "DESCRIPTION OF THE PREFERRED EMBODIMENTS" one will understand how the features of this invention offer its advantages, which include:

(1) The present invention provides a unique and novel process for producing a three-dimensional object on a layer-by-layer basis under the control of a computer. Both speed and accuracy, which are normally considered to be mutually exclusive in a prior-art layer manufacturing technique, can be achieved with the present method.

(2) Most of the prior-art layer manufacturing methods, including powder-based techniques such as 3-D printing (3DP) and selective laser sintering (SLS), are normally limited to the fabrication of an object with a uniform material composition. In contrast, the presently invented process readily allows the fabrication of an object having a spatially controlled material composition comprising two or more distinct types of material. For example, functionally gradient components can be readily fabricated with the present method.

(3) The presently invented method provides a layer-additive process which places minimal constraint on the variety of materials that can be processed. The liquid composition and the solid powder may be selected from a broad array of materials.

(4) The present method provides an adaptive layer-slicing approach and dimension sensor means to allow for in-process correction of any layer thickness variation. The present invention, therefore, offers a preferred method of layer manufacturing when part accuracy is a desirable feature.

(5) The present invention makes it possible to produce fully dense metal parts directly from the final design materials, thus eliminating intermediate or secondary processing steps sych as final sintering or metal impregnation required of 3DP and SLS. This feature enables this new technology to offer dramatic reductions in the time and cost required to realize functional metal parts. Hence, the technology provides both rapid prototyping and rapid tooling capabilities.

(6) The method can be embodied using simple and inexpensive mechanisms, so that the fabricator equipment can be relatively small, light, inexpensive and easy to maintain.

DESCRIPTION OF THE PREFERRED EMBODIMENTS

Figure 1:
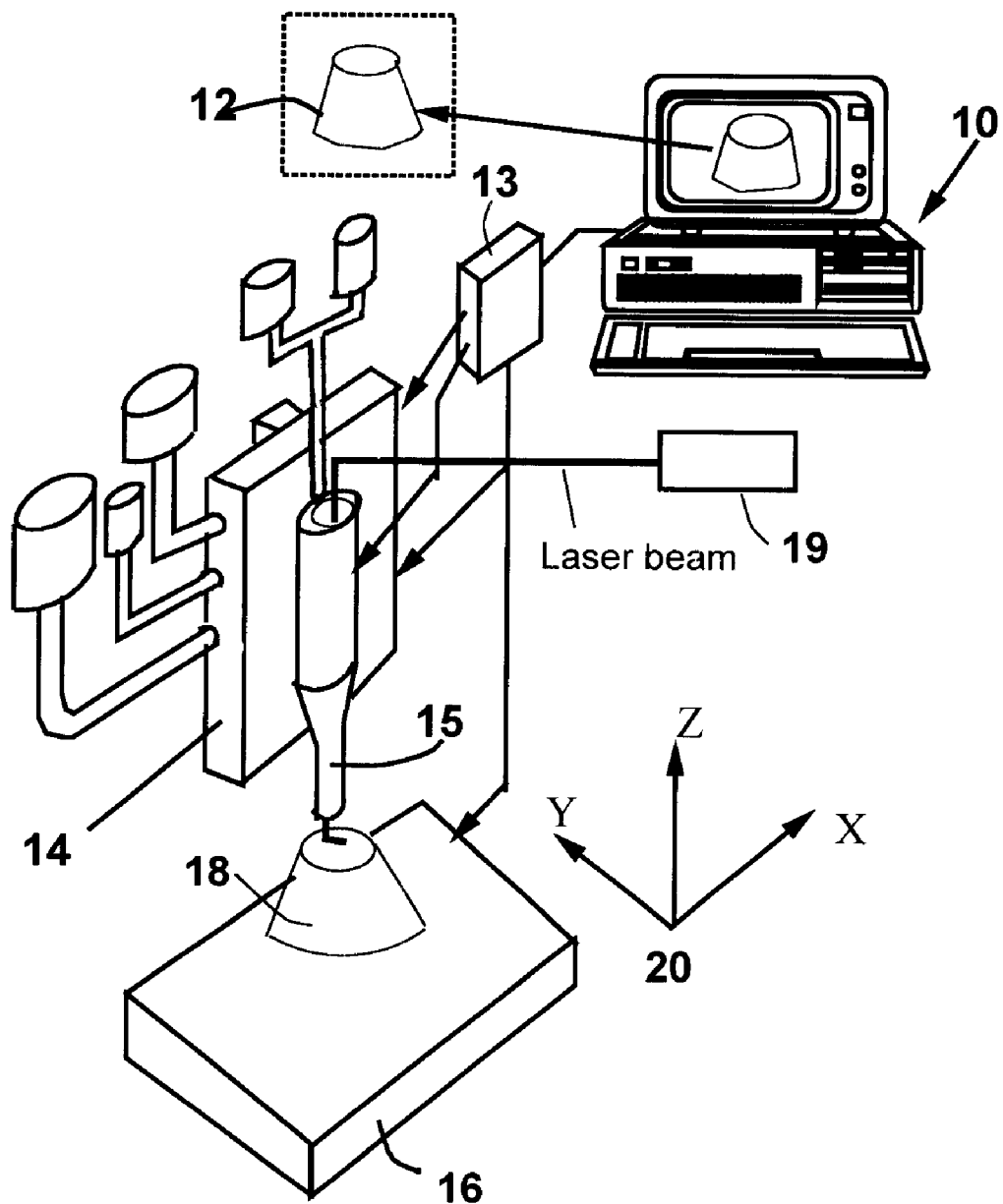
FIG. 1. Schematic of an apparatus for building a 3-D object on a layer-by-layer basis, comprising a multi-channel droplet deposition device, a powder-dispensing device assisted by a laser beam, a work surface capable of moving in an X-Y plane and in an orthogonal Z-axis in a desired sequence, and a computer control system.

In the drawings, like parts have been endowed with the same numerical references. FIG. 1 illustrates one embodiment of the apparatus of this invention for making three-dimensional objects. This apparatus is equipped with a computer 10 for creating an image 12 of an object and, through a hardware controller 13 (including signal generator, amplifier, and other needed functional parts) for controlling the operation of other components of the apparatus. One of these components is a material deposition sub-system which comprises a multiple-channel droplet deposition device 14, a powder-delivery device 17, a laser beam source 19, and a powder dispensing nozzle 15. Other components include a work surface 16, optional temperature-regulating means (not shown), pumping and/or gas pressurizing means (not shown) to control the atmosphere of a zone surrounding the work surface where a part 18 is being built, and a three dimensional movement system (not shown) to position the work surface 16 with respect to the material deposition sub-system in a direction on an X-Y plane and in a Z-direction as defined by the rectangular coordinate system 20 shown in FIG. 1.

Material Deposition Sub-System

Liquid Droplet Deposition Device: There are a broad array of liquid droplet deposition devices that can be incorporated in the presently invented apparatus. One type of deposition devices is a thermal ink jet print-head. A device of this type operates by using thermal energy selectively produced by resistors located in capillary filled ink channels near channel terminating orifices to vaporize momentarily the ink and form bubbles on demand. Each temporary bubble expels an ink droplet and propels it toward the object platform. The following patents all teach about the configurations of thermally activated print-heads: U.S. Pat. No. 4,571,599 to Rezanka, U.S. Pat. No. 4,463,359 to Ayata, et al., and U.S. Pat. No. 4,829,324 to Drake, et al.

In the present invention, a preferred droplet deposition device is a piezoelectric activated ink jet print-head that uses a pulse generator to provide an electric signal. The signal is applied across piezoelectric crystal plates, one of which contracts and the other of which expands, thereby causing the plate assembly to deflect toward a pressure chamber. This causes a decrease in volume which imparts sufficient kinetic energy to the ink in the print-head nozzle so that one ink droplet is ejected through an orifice. Examples of piezoelectric activated ink jet print-heads may be found in U.S. Pat. No. 4,549,191 to Fukuchi and Ushioda, U.S. Pat. No. 4,584,590 to Fishbeck and Wright, and U.S. Pat. No. 4,887,100 to Michaelis.

Figure 2A:
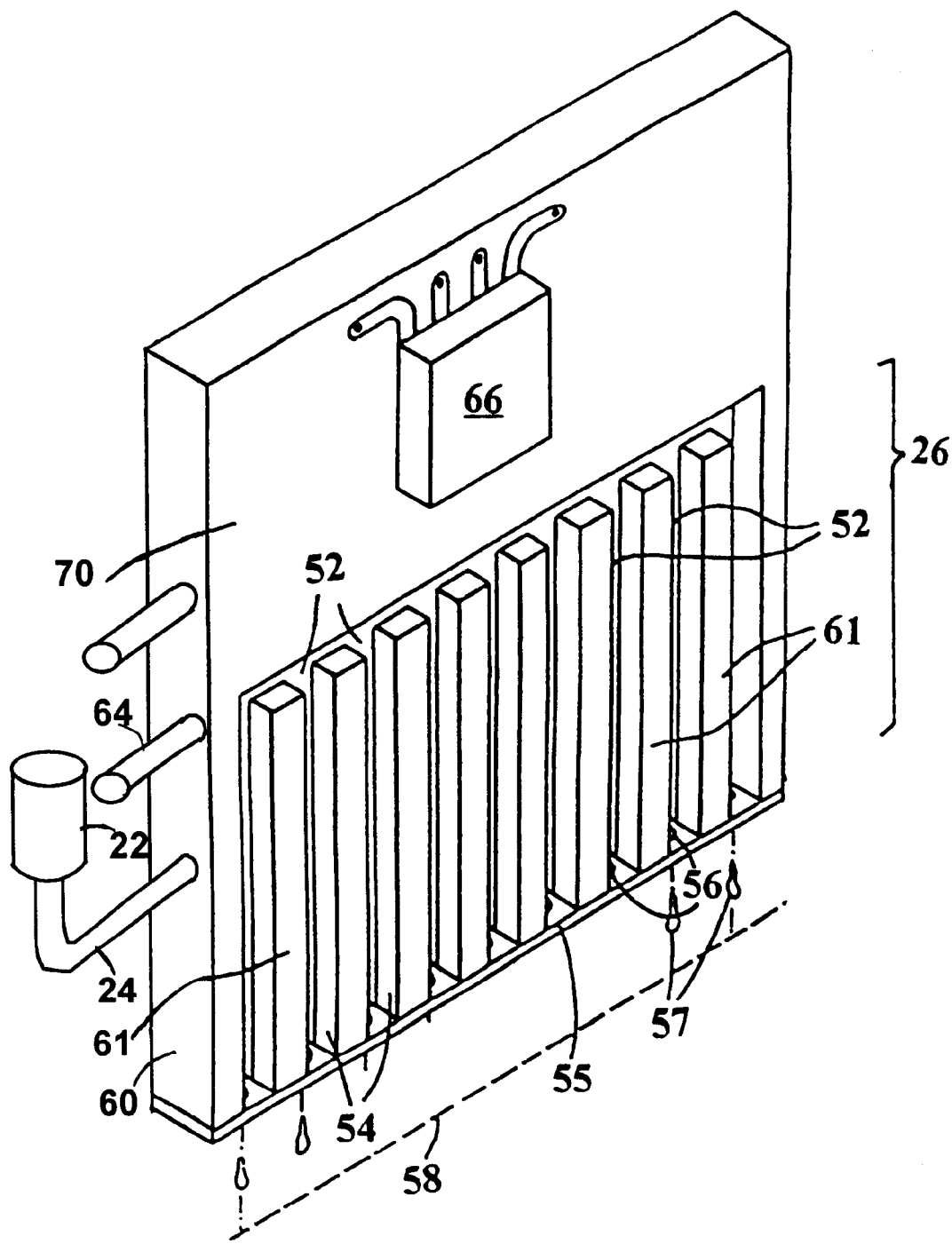
FIG.2. Schematic of an example of a piezo-electrically actuated multi-channel ink jet print-head for depositing droplets of liquid compositions.
Figure 2C:
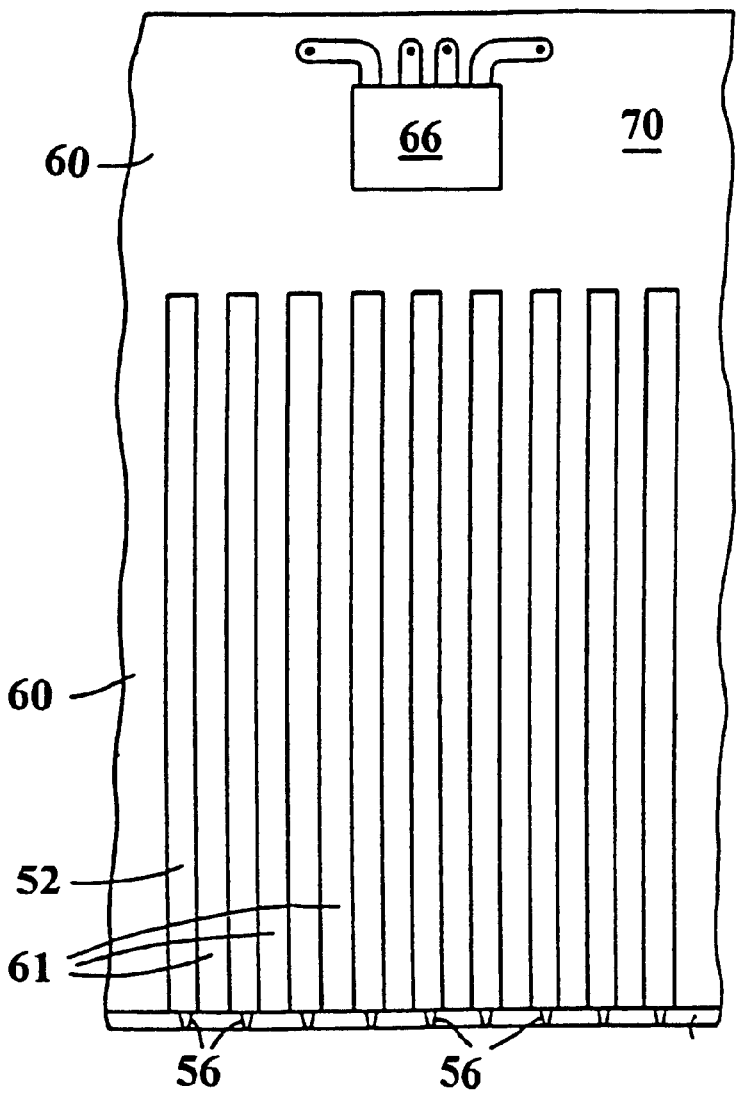
Figure 2B:
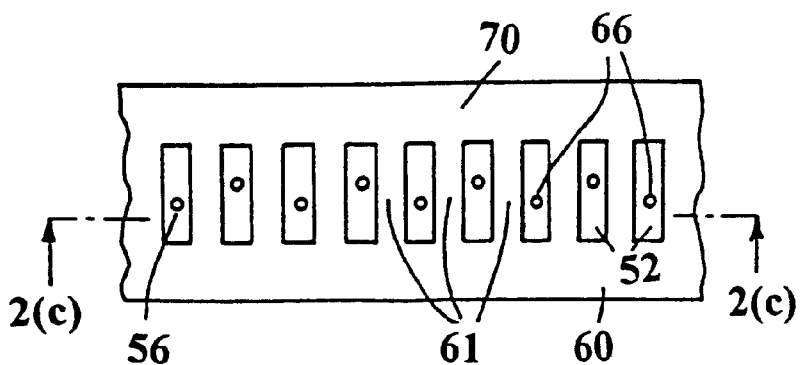

An example of a piezo-electric activated ink jet print-head is shown in FIG. 2. This droplet deposition device is a planar high-density array, drop-on-demand ink jet print-head, comprising a print-head body 60 formed with a multiplicity of parallel ink channels 52, nine only of which are shown and the longitudinal axes of which are disposed in a plane. The channels 52 contain liquid compositions 54 and terminate at corresponding ends thereof in a nozzle plate 55 in which are formed orifices 56, one for each channel. Ink droplets 57 are ejected on demand from the channels 52 and deposited on selected spots of a print line 58 on a previous layer of an object or a surface of the object platform.

The print-head body 60 has a planar base part 70 in which the channels 52 are cut or otherwise formed so as to extend in parallel rearwardly from the nozzle plate 55. The channels 52 are long and narrow with a rectangular cross section and have opposite side walls 61 which extend the length of the channels. The side walls 61 are displaceable transversely relative to the channels axes along substantially the whole of the length thereof, as later described, to cause changes of pressure in the liquid composition in the channels to produce droplet ejection from the orifices 56. Each of the channels 52 connects at its end remote from the orifice, with a transverse channel (not shown) which in turn connects with a liquid supplying reservoir 22 by way of pipe means 24 or 64. Electrical connections (not shown) for activating the channel side walls 61 are made to a silicon chip 66 on the base part 70. Reservoirs are there to receive liquids containing a baseline material and several different colorants. Only one 22 of possibly several reservoirs is shown in FIG. 2. Additional reservoirs may be connected to pipes such as 64. The droplet deposition device as illustrated in FIG. 2 is similar to what is disclosed in U.S. Pat. No. 4,887,100. The present device shown in FIG. 2 contains separate reservoirs and pipes that could supply different liquid compositions. Preferably, at least one of the liquid compositions comprises a baseline material for building exterior regions of the object and a second composition, possibly lower melting point, for building a support structure.

In an alternative embodiment of the presently invented apparatus, the multiple-channel device may be simply a plurality of separate droplet deposition devices, each having only one or two channels. In a two-channel device, one channel may be used to deposit a baseline material while the other to deposit a support structure.

Preferably, a portion of the liquid deposition device is provided with temperature-controlled means (not shown) to ensure that the material remains in a flowable state while residing in a reservoir, pipe, or channel prior to being dispensed.

Heating and cooling means (e.g., heating elements, cooling coils, thermocouple, and temperature controller; not shown) may be provided to a region surrounding the work surface 16 to control the solidification behavior of the material on the platform. A protective atmosphere, e.g., inert gas, may be introduced to prevent oxidation of the materials involved.

Figure 3:
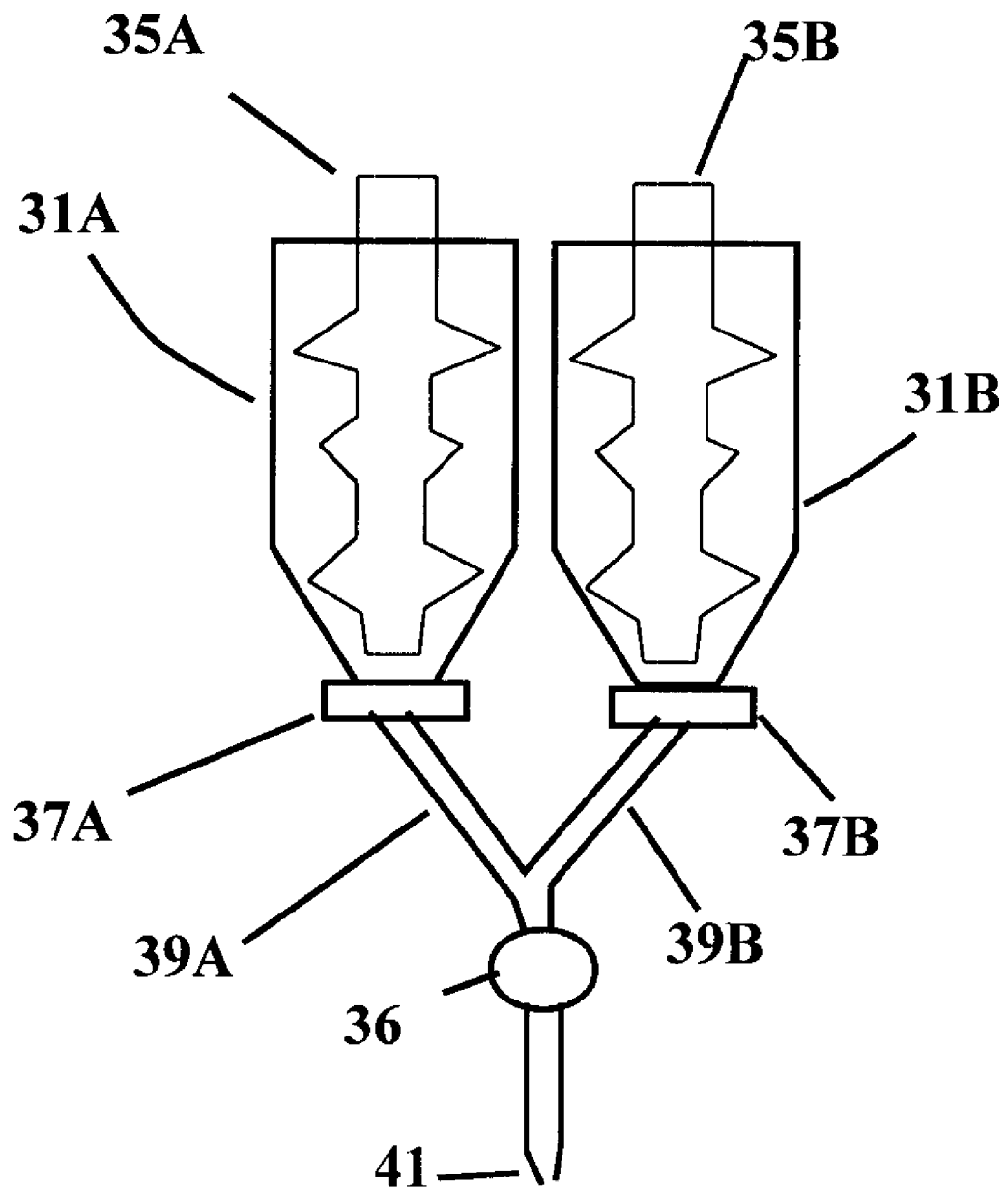
FIG.3. Schematic drawing of a simple multi-channel powder-delivery device.

Solid Powder Deposition Device: FIG. 3A schematically shows a multi-channel powder delivery system which is capable of supplying and dispensing a mixture of different powders at a desired proportion. Only two channels are shown here. The two chambers 31A,31B are used to house different solid powders. An optional stirring device 35A or 35B is used to facilitate feeding of powder particles through valves 37A or 37B. These valves are preferably electronically connected to the machine controller 13, which is regulated by the computer 10. If a valve is turned on, powder particles will flow through a pipe 39A or 39B, enter an optional mixing chamber 36, and be dispensed through an orifice 41. The mixing chamber 36 provides a place where different powders coming from different chambers can be mixed together before they are dispensed. The proportion between powders can be readily varied continuously or intermittently by adjusting, for instance, the opening sizes of the valves 37A, 37B.

Figure 3B:
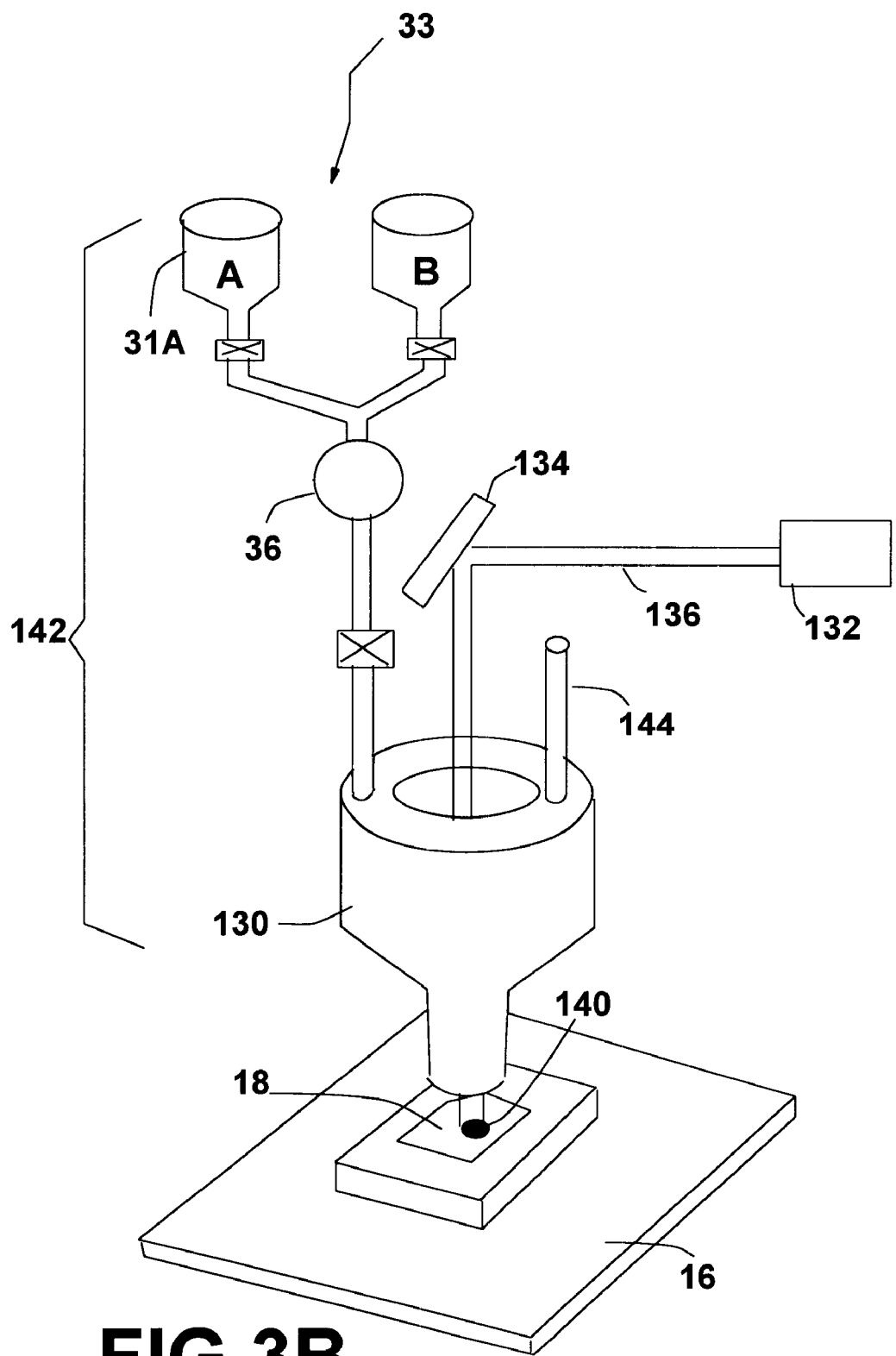

FIG. 3B schematically shows a preferred powder-handling assembly unit 142 that comprises a powder delivery device 33, as described in FIG. 3A, a powder-dispensing nozzle 130, a laser beam source 132, and lens 134. The orifice 41 of the powder delivery device 33 is extended to the bottom 138 of the nozzle 130. A laser beam 136 originates from the beam source 132 is directed by lens means 134 to produce a heat affected zone, below the nozzle bottom 138, for forming a weld pool 140 of molten material on the work surface or the surface of a preceding layer. The orifice 41, extended to the bottom of the nozzle, is oriented in such a fashion that the powder will be injected to approximately the center of the weld pool 140. The whole powder-handling assembly 142 is preferably driven to move as one integral unit to ensure that the powder is always injected to approximately the center of the heat-affected zone. When the heat-affected zone moves away from a weld pool spot, the molten material left behind will readily solidifies. The movement of this unit 142 is preferably under the control of a CAD computer to trace out a desired cross-section for each layer of the object. It may be noted that, although a laser beam is a preferred heat source, any heating means capable of creating a small weld pool may be utilized, including electron beam, induction coils, etc.

Figure 4:
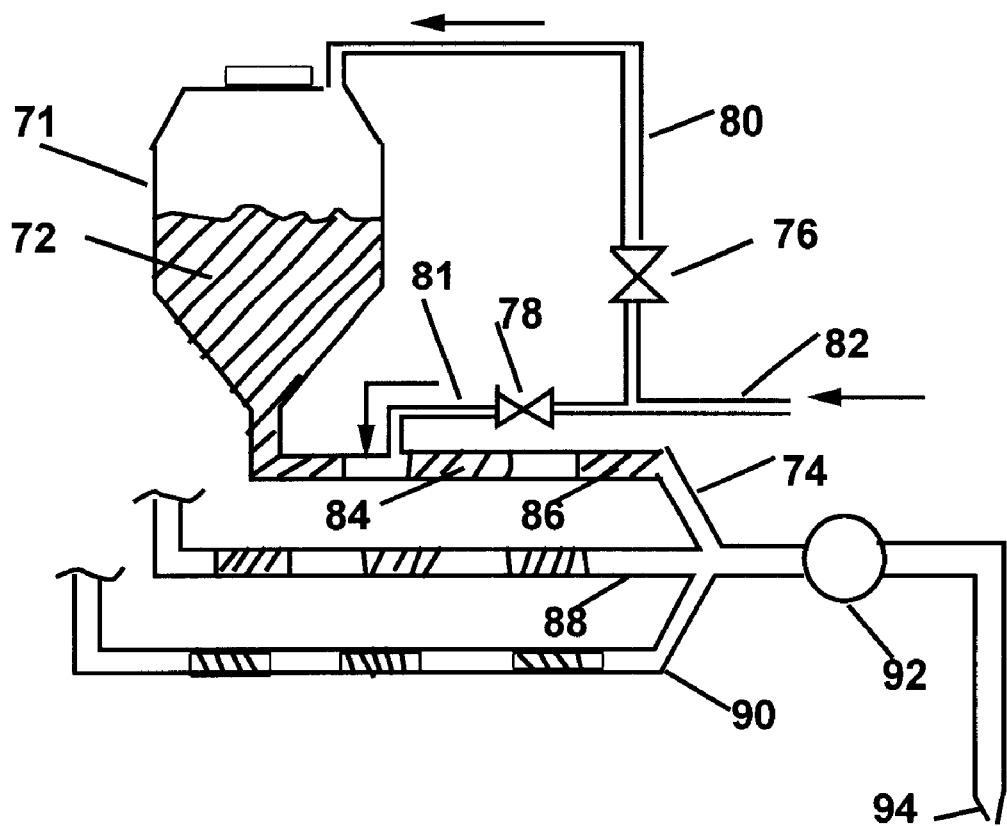
FIG.4. Schematic drawing of a multi-channel plug-phase pneumatic powder conveying and dispensing device.

FIG. 4 schematically shows another example of a multiple-channel powder delivery device. Only three channels of this pneumatic or air-driven apparatus are shown. This device makes use of the approach known as plug-phase conveying to reduce clogging that frequently occurred to dense-phase conveying. Both approaches are well known in the art of pneumatic powder transportation. In the present device, a container 71 is used to house a powder 72. Compressed air is introduced through pipe 82. Then, through alternating operations of valves 76 and 78, air runs through pipes 80 and 81, respectively, to create and convey forward distinct plugs 84, 86 of powder material in first channel 74. Other channels (e.g., 88 and 90) may be similarly equipped with containers, pipes, and valves (not shown) to create and move plugs of different types of powder material. Plugs of materials may be allowed to mix at an optional mixing chamber 92 and then dispensed through an orifice 94 of a nozzle. The present device does not provide a continuous flow of powder because plugs of material are separated by plugs of air. If necessary, however, a continuous flow of powder can be achieved by running two parallel pipelines operating at opposite phases. Again, preferably, the discharge orifice 94 may be extended to the bottom of a nozzle (e.g., 130 in FIG. 3B) through a powder feeding tube 144. With the present device, by controlling the velocity of plugs throughout each of the material supply systems, different proportions of each material could be combined and deposited. Such a multiple-channel powder delivery device will make it possible to produce parts with spatially tailored material compositions.

Work Surface

Referring again to FIG. 1, the object work surface 16 is located in close, working proximity to the dispensing nozzles of the material deposition sub-system. The upper surface of the work surface preferably has a flat region sufficiently large to accommodate the first few layers of the deposited material. Preferably, the liquid deposition device 14 and powder dispensing device 15 of the material deposition sub-system are fastened to move as one unit. The work surface 16 and the material deposition sub-system are equipped with mechanical drive means for moving the platform relative to the deposition device in three dimensions along the X-, Y-, and Z-axes in a rectangular coordinate system in a predetermined sequence and pattern, and for displacing the nozzle a predetermined incremental distance relative to the work surface. This can be accomplished, for instance, by allowing the work surface 16 to be driven by three linear motion devices, which are powered by three stepper motors to provide movements along the X-, Y-, and Z-directions, respectively. Motor means are preferably high resolution reversible stepper motors, although other types of drive motors may be used, including linear motors, servomotors, synchronous motors, D.C. motors, and fluid motors. Mechanical drive means including linear motion devices, motors, and gantry type positioning stages are well known in the art.

Z-axis movements are executed to displace the work surface 16 relative to the material deposition sub-system or to displace the deposition sub-system relative to the work surface and, hence, relative to each layer deposited prior to the start of the formation of each successive layer. In one possible arrangement, the deposition sub-system may be mounted in a known fashion for movement in the X-Y plane, with the work surface 16 supported for separate movement toward and away from the deposition sub-system along the Z-direction. Alternatively, the work surface may be supported for movement in the X-Y plane, with the deposition sub-system mounted for separate movement along the Z-direction toward and away from the work surface. Another alternative is to have the movements in the X-Y plane and in the Z-direction all to be carried out by either the work surface only or by the deposition sub-system only. It will be understood that movement in the X-Y plane need not be limited to movement in orthogonal directions, but may include movement in radial, tangential, arcuate and other directions in the X-Y plane.

These movements will make it possible for the deposition sub-system to deposit and form multiple layers of materials of predetermined thickness, which build up on one another sequentially as the material solidifies after discharge from the orifice or after leaving the heat-affected zone. The rate at which the droplets are discharged from the inkjet discharge orifice onto the platform is dictated by the frequency of the piezo-electric pulses and the orifice size. This rate can be adjusted, by varying the pulse signal generating speed, to meet the possible needs of variable rate at which the nozzle moves with respect to the work surface. The powder deposition rate depends upon the valve opening sizes (e.g., in FIG. 3) and the powder plug transport rate (FIG. 4).

Sensor means may be attached to proper spots of the object work surface or the material deposition sub-system to monitor the physical dimensions of the physical layers being deposited. The data obtained are fed back periodically to the computer for re-calculating new layer data. This option provides an opportunity to detect and rectify potential layer variations; such errors may otherwise cumulate during the build process, leading to significant part inaccuracy. Many prior art dimension sensors may be selected for use in the present apparatus.

Materials

The liquid compositions do not have to be in a melt state. A water-soluble material such as poly (ethylene oxide) may be allowed to mix with a predetermined amount of water to form a flowable solution or paste. Some materials (e.g., plaster and starch) may be dispersed, but not completely dissolved, in water or another type of non-toxic liquid. These types of materials may also be fed into the reservoirs along with water or a proper liquid to make a paste. This fluid may also be mixed with a selected colorant, preferably in liquid or fine powder form to form an ejectable liquid composition.

The discharged fluid that comes in contact with the object work surface or a previous layer must meet two conditions. The first condition is that this material must have a sufficiently high viscosity to prevent excessive flow (splattering or spreading up) when being deposited; this is required in order to achieve good dimensional accuracy. The second condition is that the newly discharged material must be able to adhere to a previous layer. These two conditions can be met by discharging the following types of materials under a specified condition:

Type I: A ceramic, metallic, wax, or semi-crystalline polymer material must be maintained at a temperature above its melting point just before being discharged by a print-head or left out of a heat-affected zone. The object work surface and the previous layers must be maintained at a temperature lower than its melting temperature. The portion of the previous layer facing the deposition device must have been substantially solidified before the new material is brought in contact with this portion of the previous layer. Examples of semi-crystalline polymers are polyamide (or nylon), poly (ethylene terephthalate) (PET), and polypropylene (PP). For the purpose of rapid tooling, metals such as stainless steel, tool steel, Inconel 625, and Ti-6Al-4V are preferred materials to use.

Type II: A non-crystalline material such as glass (e.g., boro-silicate glass and soda-lime-silica glass) and amorphous thermoplastic polymer material must be maintained at a temperature slightly above its glass transition temperature just before being discharged. The object platform and the previous layers must be maintained at a temperature lower than its glass transition temperature. The portion of the previous layer facing the nozzle must have been solidified before the new material is brought in contact with this portion of the previous layer. Examples of substantially amorphous thermoplastic polymers are polystyrene (PS), acrylonitrile-butadiene-styrene copolymer (ABS), poly methyl methacrylate (PMMA), and poly carbonate (PC).

Type III: A fast-curing thermosetting resin (e.g., a two-part epoxy) may be maintained in an oligomer state prior to being discharged. As soon as being dispensed, the resin will rapidly gel to an extent that the glass transition temperature of this reacting resin quickly approaches or exceeds the object platform environment temperature, thereby solidifying the resin. The crosslinking process of selected resins, e.g., some photo curable epoxy resins commonly used in stereo lithography, may be further accelerated by exposing the deposited resin to an ultraviolet beam. Fast curing resins are well known in the art and several formulations are commercially available. Ejection of resin droplets may be used for creating a smooth surface for a polymer object whose bulk is built by repeating the step of moving the heat-affected zone away from a weld pool spot.

Mathematical Modeling and Creation of Logical Layers

Figure 5:
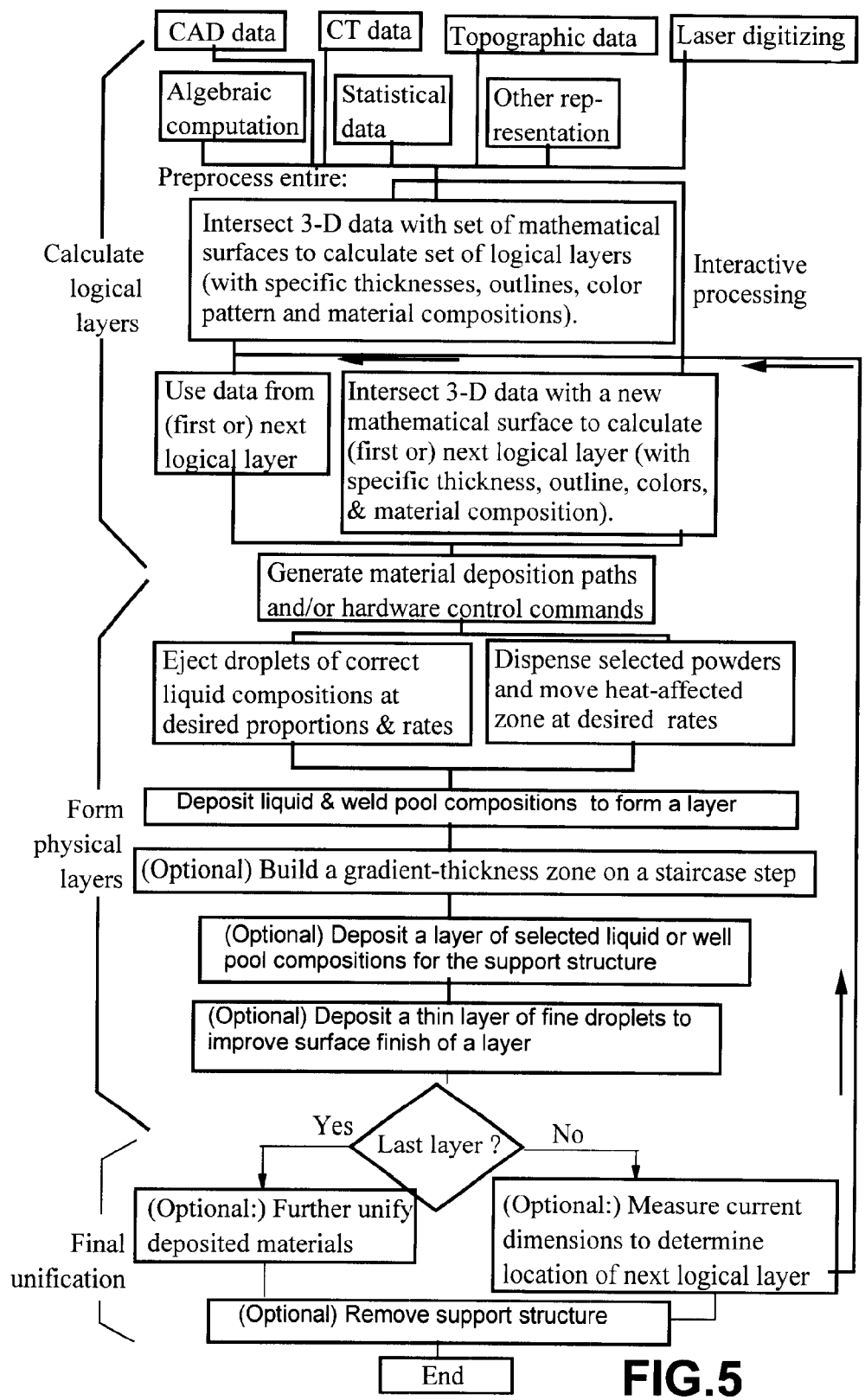
FIG.5. Flow chart indicating a preferred process that involves using a computer and required software programs for adaptively slicing the image of an object into layer data, for optionally generating data files for support structures, and for controlling various components of the 3-D object building apparatus.

A preferred embodiment of the present invention is a solid freeform fabrication process in which the execution of various steps may be illustrated by the flow chart of FIG. 5. The process begins with the creation of a mathematical model (e.g., via computer-aided design, CAD), which is a data representation of a 3-D object. This model is stored as a set of numerical representations of layers which, together, represent the whole object. A series of data packages, each data package corresponding to the physical dimensions of an individual layer of deposited materials, is stored in the memory of a computer in a logical sequence so that the data packages correspond to individual layers of the materials stacked together to form the object.

Specifically, before the constituent layers of a 3-D object are formed, the geometry of this object is logically divided into a sequence of mutually adjacent theoretical layers, with each theoretical layer defined by a thickness and a set of closed, nonintersecting curves lying in a smooth two-dimensional (2-D) surface. These theoretical layers, which exist only as data packages in the memory of the computer, are referred to as "logical layers." This set of curves forms the "contour" of a logical layer or "cross section". In the simplest situations, each 2-D logical layer is a plane so that each layer is flat, and the thickness is the same throughout any particular layer. However, this is not necessarily so in every case, as a layer may have any desired curvature and the thickness of a layer may be a function of position within its two-dimensional surface. The only constraint on the curvature and thickness function of the logical layers is that the sequence of layers must be logically adjacent. Therefore, in considering two layers that come one after the other in the sequence, the mutually abutting surfaces of the two layers must contact each other at every point, except at such points of one layer where the corresponding point of the other layer is void of material as specified in the object model.

As summarized in the top portion of FIG. 5, the data packages for the logical layers may be created by any of the following methods:

(1) For a 3-D computer-aided design (CAD) model, by logically "slicing" the data representing the model, (2) For topographic data, by directly representing the contours of the terrain,
(3) For a geometrical model, by representing successive curves which solve "z=constant" for the desired geometry in an x-y-z rectangular coordinate system, and
(4) Other methods appropriate to data obtained by computer tomography (CT), magnetic resonance imaging (MRI), satellite reconnaissance, laser digitizing, line ranging, or other methods of obtaining a computerized representation of a 3-D object.

An alternative to calculating all of the logical layers in advance is to use sensor means to periodically measure the dimensions of the growing object as new layers are formed, and to use the acquired data to help in the determination of where each new logical layer of the object should be, and possibly what the curvature and thickness of each new layer should be. This approach, called "adaptive layer slicing", could result in more accurate final dimensions of the fabricated object because the actual thickness of a sequence of stacked layers may be different from the simple sum of the intended thicknesses of the individual layers.

The closed, nonintersecting curves that are part of the representation of each layer unambiguously divide a smooth two-dimensional surface into two distinct regions. In the present context, a "region" does not mean a single, connected area. Each region may consist of several island-like subregions that do not touch each other. One of these regions is the intersection of the surface with the desired 3-D object, and is called the "positive region" of the layer. The other region is the portion of the surface that does not intersect the desired object, and is called the "negative region." The curves are the boundary between the positive and negative regions, and are called the "outline" of the layer. In the present context, the liquid droplets and the weld pool materials are allowed to be deposited in the "positive region" while a different material may be deposited in certain parts or all of the "negative region" in each layer to serve as a support structure.

A preferred embodiment of the present invention contains a material deposition sub-system, an object work surface, and motion devices that are regulated by a computer-aided design (CAD) computer 10 and a machine controller 13. For example, as schematically shown in FIG. 1, the CAD computer with its supporting software programs operates to create a three-dimensional image of a desired object 12 or model and to convert the image into multiple elevation layer data, each layer being composed of a plurality of segments.

As a specific example, the image of a three-dimensional object 12 may be converted into a proper format utilizing commercially available CAD/Solid Modeling software. A commonly used format is the stereo lithography file (.STL), which has become a defacto industry standard for rapid prototyping. The object image data may be sectioned into multiple layers by a commercially available software program. Each layer has its own shape and dimensions. These layers, each being composed of a plurality of segments, when combined together, will reproduce the complete outline of the intended object. When a variable-composition object is desired, these segments are preferably sorted in accordance with their material compositions. This can be accomplished by taking the following procedure:

When the stereo lithography (.STL) format is utilized, the image is represented by a large number of triangular facets that are connected to simulate the exterior and interior surfaces of the object. The triangles may be so chosen that each triangle covers one and only one material composition. In a conventional .STL file, each triangular facet is represented by three vertex points each having three coordinate points, $(x_1,y_1,z_1)$, $(x_2,y_2,z_2)$, and $(x_3,y_3,z_3)$, and a unit normal vector $(i,j,k)$. Each facet is now further endowed with a composition code. During the slicing step, neighboring data points with the same composition code on the same layer may be sorted together. These segment data are then converted into programmed signals (data for selecting deposition tools and tool paths) in a proper format, such as the standard NC G-codes commonly used in computerized numerical control (CNC) machinery industry. These layering data signals may be directed to a machine controller which selectively actuates the motors for moving the deposition sub-system with respect to the object work surface, activates signal generators, drive the valve means in the powder dispensing device, drives the optional vacuum pump means, and operates optional temperature controllers, etc. It should be noted that although .STL file format has been emphasized in this paragraph, many other file formats have been employed in different commercial rapid prototyping and manufacturing systems. These file formats may be used in the presently invented system and each of the constituent segments for the object image may be assigned a composition code.

The three-dimensional motion controller is electronically linked to the mechanical drive means and is operative to actuate the mechanical drive means in response to "X," "Y," "Z") axis drive signals for each layer received from the CAD computer. Controllers that are capable of driving linear motion devices are commonplace. Examples include those commonly used in a milling machine.

Numerous software programs have become available that are capable of performing the presently specified functions. Suppliers of CAD/Solid Modeling software packages for converting CAD drawings into .STL format include SDRC (Structural Dynamics Research Corp. 2000 Eastman Drive, Milford, Ohio 45150), Cimatron Technologies (3190 Harvester Road, Suite 200, Burlington, Ontario L7N 3N8, Canada), Parametric Technology Corp. (128 Technology Drive, Waltham, Mass. 02154), and Solid Works (150 Baker Ave. Ext., Concord, Mass. 01742). Optional software packages may be utilized to check and repair .STL files which are known to often have gaps, defects, etc. AUTOLISP can be used to convert AUTOCAD drawings into multiple layers of specific patterns and dimensions.

Several software packages specifically written for rapid prototyping have become commercially available. These include (1) SOLIDVIEW RP/MASTER software from Solid Concepts, Inc., Valencia, Calif.; (2) MAGICS RP software from Materialise, Inc., Belgium; and (3) RAPID PROTOTYPING MODULE (RPM) software from Imageware, Ann Arbor, Mich. These packages are capable of accepting, checking, repairing, displaying, and slicing .STL files for use in a solid freeform fabrication system. MAGICS RP is also capable of performing layer slicing and converting object data into directly useful formats such as Common Layer Interface (CLI). A CLI file normally comprises many "polylines" with each polyline being an ordered collection of numerous line segments. These and other software packages (e.g. Bridgeworks from Solid Concepts, Inc.) are also available for identifying an un-supported feature in the object and for generating data files that can be used to build a support structure for the unsupported feature. The support structure may be built by a separate fabrication tool or by the same deposition device that is used to build the object.

A company named CGI (Capture Geometry Inside, currently located at 15161 Technology Drive, Minneapolis, Minn.) provides capabilities of digitizing complete geometry of a three-dimensional object. Digitized data may also be obtained from computed tomography (CT) and magnetic resonance imaging (MRI), etc. These digitizing techniques are known in the art. The digitized data may be re-constructed to form a 3-D model on the computer and then converted to .STL files. Available software packages for computer-aided machining include NC Polaris, Smartcam, Mastercam, and EUCLID MACHINIST from MATRA Datavision (1 Tech Drive, Andover, Mass. 01810).

Formation of the Physical Layers

The data packages are stored in the memory of a computer, which controls the operation of an automated fabricator comprising a material deposition subsystem, an object work surface, and motion devices. Using these data packages, the computer controls the automated fabricator to manipulate the fabrication materials (liquid compositions and weld pool materials) to form individual layers of materials in accordance with the specifications of an individual data package. The liquid material compositions used to form the layer contours preferably have the property that they can be readily solidified and consolidated layer-by-layer. In one embodiment of the invention, the deposited materials have the further property that the contours of the fabrication materials when brought into contact bond to each other so that individual layers can be readily unified.

As indicated earlier, the fabrication materials do not have to be homogeneous. They may, for example, exhibit variations in composition based upon the structural or physical requirements of the desired object begin built. These variations may serve to accomplish internal variations of the physical properties of the object, such as hardness, mass density, and coefficient of thermal expansion and variations of external appearance such as color patterns. In one preferred embodiment, the powder particles injected into the weld pool may be deposited to comprise a spatially controlled material composition comprising two or more distinct types of materials. In a further specific embodiment, the powder particles may be deposited in continuously varying concentrations of distinct types of materials. These material composition variations can be readily accomplished by operating the presently discussed powder-dispensing device.

If composition variation of a deposition material is desired within any particular layer, and if the mechanism (e.g., in FIGS. 2, 3, and 4) for depositing the fabrication material has the capability of depositing the required various compositions automatically, then the variation in composition may be represented mathematically within the data package for each layer, and the mathematical representation may be used to control the composition of materials deposited. However, if the mechanism for depositing a material is limited to providing layers of any one specific composition at a time, then variations in composition may be accomplished by logically separating a particular layer into sub-layers, where each sub-layer is composed of a different material, and the union of the sub-layers is equal to the particular layer. Each sub-layer is then treated as a distinct layer in the deposition process, and the complete layer is formed by the formation and bonding of a succession of its constituent sub-layers. If the interface between sub-layers is along surfaces perpendicular to the layers, and not along surfaces parallel to the layers, then the bonding of each sub-layer is not to the previous sub-layer, but to the previous complete layer.

Figure 6A:
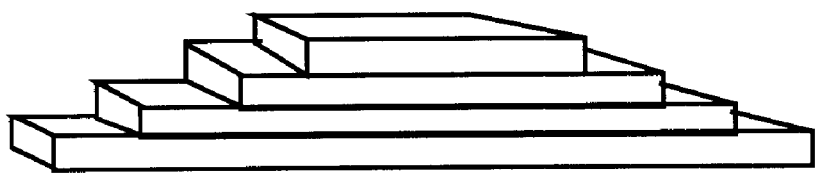
FIG 6. (A) schematically shows the "staircase effect" of an object built by layer-manufacturing; (B) schematically shows a perspective view of the desired 3-D shape of this object; (C) and (D) schematically show that this staircase effect can be effectively reduced or eliminated by depositing fine liquid droplets in a gradient-thickness manner onto the peripheral or exterior boundary regions of individual layers; and (E) shows that a peripheral region may be sliced into several thinner logical layers which can be converted into programmed signals to drive the deposition of liquid droplets in this region.
Figure 6B:
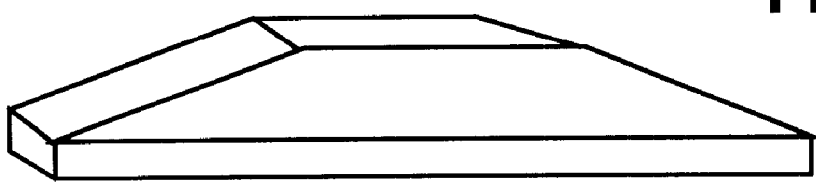
Figure 6C:
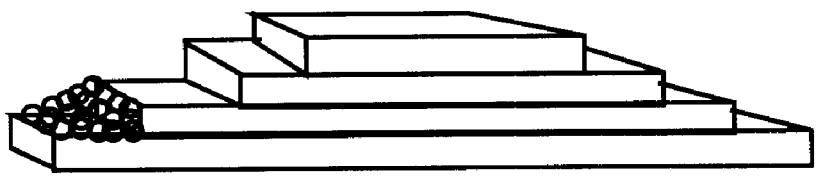
Figure 6D:
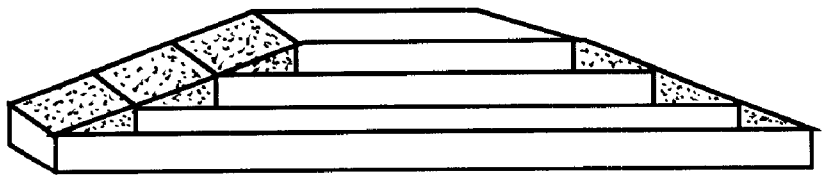
Figure 6E:
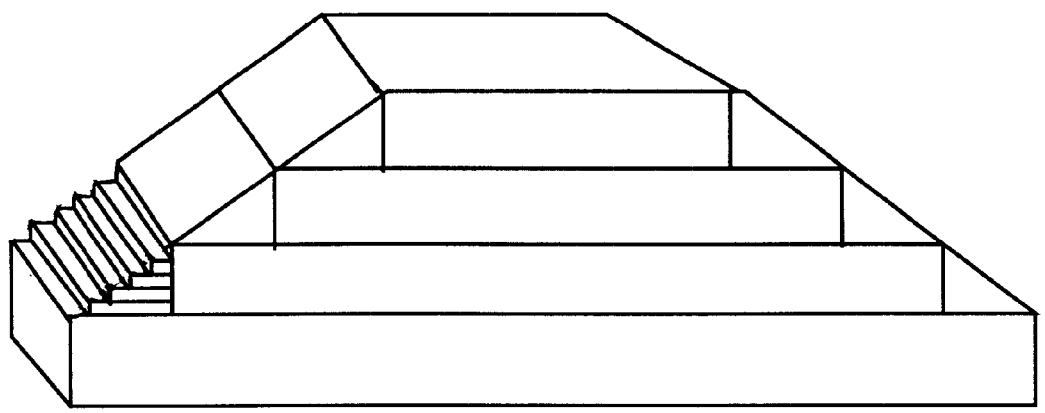

FIG. 6(B) schematically shows a perspective view of a desired 3-D object. This object, if built by a conventional SFF technique layer-by-layer, will likely show a "staircase effect" as indicated in FIG. 6(A). As shown in FIGS. 6(C) and (D), the staircase steps (near the peripheral zones of a given layer) between two layers may be deposited with fine liquid droplets in a gradient-thickness manner. These droplets are stacked one upon another with the thickness varying from being very thin (e.g. one droplet size) at one end of each "step" to being as thick as the next layer at another end of this step. These step zones may be built primarily with fine liquid droplet compositions while the bulk of individual layers may be built with the weld pool approach using possibly a larger-sized pool for an improved speed. This strategy effectively reduces or eliminates the staircase effect and, hence, improving the part accuracy. This strategy may be carried out, for instance, by further dividing each staircase step zone into several thinner sub-layers, as schematically shown in FIG. 6(E). Each sub-layer may be mathematically considered as a logical layer of which the data can be converted into programmed signals to drive the liquid droplet deposition device to form a gradient-thickness step zone.

With such an added capability, it is now possible to slice the object into much thicker layers and fill the interior space with large amounts of weld pool materials at a higher rate. Thicker layers mean a shorter mathematical slicing time, fewer layers to build, and faster over-all build rate. Slicing thicker layers in other SFF technologies would normally result in a loss of accuracy due to a more severe staircase effect. In the present invention, however, the problem of staircase effect can be overcome by building gradient-thickness staircase zones and/or peripheral zones. Hence, both speed and precision can be achieved with the presently invented process and apparatus.

As another embodiment of the present invention, therefore, a solid freeform fabrication process may comprise the steps of (1) positioning a material deposition sub-system a selected distance above a work surface; (2) operating this sub-system to deposit materials onto the work surface; and (3) during this material deposition process, moving the deposition sub-system and the work surface relative to one another in a plane defined by first and second directions (X- and Y-directions) and in a third direction (Z-) orthogonal to the X-Y plane to form a three-dimensional shape. The deposition step comprises the steps of (a) operating a multiple-channel liquid droplet deposition device for supplying and ejecting multiple liquid compositions in the form of droplets on demand onto selected spots of the work surface; (b) operating a focused heat source to produce a heat-affected zone on the work surface; and (c) operating a solid powder-dispensing device for discharging powder particles to the heat-affected zone for forming a weld pool of molten material of a predetermined size. These three steps, (a), (b), and (c), may be carried out in a predetermined sequence.

The above-cited moving step preferably includes the steps of (a) moving the material deposition sub-system and the work surface relative to one another in a direction parallel to the X-Y plane to form a first layer of the materials on the work surface; (b) moving the deposition sub-system and the work surface away from each other by a predetermined layer thickness; and (c) after the portion of the first layer adjacent to a nozzle of the material deposition sub-system has substantially solidified, depositing a second layer of the materials onto the first layer while simultaneously moving the work surface and the deposition sub-system relative to one another in a direction parallel to the X-Y plane, whereby the second layer solidifies and adheres to the first layer.

Preferably, the process further comprises additional steps of forming multiple layers of the materials on top of one another by repeated depositing of materials from the droplet ejection device and the weld pool as the work surface and the deposition sub-system are moved relative to one another in a direction parallel to the X-Y plane, with the deposition sub-system and the work surface being moved away from one another in the Z-direction by a predetermined layer thickness after each preceding layer has been formed, and with the depositing of each successive layer being controlled to take place after the material in the preceding layer immediately adjacent the nozzle has substantially solidified. These steps can be accomplished by operating the apparatus described above either manually or, preferably, under the control of a computer system.

Therefore, another preferred embodiment is a process as set forth in the above three steps, (1) through (3) plus (a), (b) and (c ), further comprising the steps of (4) creating an image of the three-dimensional object on a computer with the image including a plurality of segments defining the object; (6) generating programmed signals corresponding to each of these segments in a predetermined sequence; and (7) moving the deposition sub-system and the work surface relative to one another in response to the programmed signals. These additional steps provide computerized control over the relative motions between the deposition sub-system and the work surface to build a 3-D object. However, the material composition distribution pattern of an object is not necessarily predetermined. The adjustments of compositions for different portions of an object can be made at any time during the object building process or in a random fashion, if so desired.

If a predetermined material distribution pattern is desired before the object building process begins, then this pattern may be defined by attaching a material composition code to each of the constituent segments defining the object. When the computer reads a specific code, during the object building process, it will send out proper control signals to select the correct channels for ejecting droplets of selected compositions and/or injecting selecting powders into the weld pool. Therefore, another embodiment of the present invention is a process as set forth in the above three steps, (1) through (3), but further comprising the steps of (d) creating an image of the object on a computer with the image including a plurality of segments defining the object and with each of the segments being coded with a composition defined by the operation of a specific set of selected droplet and/or powder channels; (e) generating programmed signals corresponding to each of these segments in a predetermined sequence; (f) operating the pulse generator (actuator means) in response to the programmed signals to activate selected channels; and (g) moving the deposition sub-system and the work surface relative to one another in response to the programmed signals.

As indicated earlier, the most popular file format used by all commercial rapid prototyping machines is the .STL format. The .STL file format describes a CAD model's surface topology as a single surface represented by triangular facets. By slicing through the CAD model simulated by these triangles, one would obtain coordinate points that define the boundaries of each cross section. It is therefore convenient for a dispensing nozzle to follow these coordinate points to trace out the perimeters of a layer cross section. These perimeters may be built with a proper material composition pattern (e.g., a desired color pattern) to form an outer boundary of the object. The outer boundary defines an exterior surface of the object.

This outer boundary defines an interior space in the object. Hence, the moving step may further include the step of moving the deposition sub-system and the work surface relative to one another in one direction parallel to the X-Y plane according to at least one other predetermined pattern to fill this interior space with selected weld pool materials. The interior does not have to have the same material composition as the exterior boundary. The interior space may be built with materials of a spatially controlled composition comprising one or more distinct types of materials. The weld pool may be deposited in continuously varying concentrations of distinct types of materials. This process may further comprise the steps of (h) creating an image of the object on a computer with the image including a plurality of segments defining the object; and (i) generating program signals corresponding to each of these segments in a predetermined sequence, wherein the program signals determine the movement of the deposition sub-system and the work surface relative to one another in the first predetermined pattern and at least one other predetermined pattern.

The above procedures of delineating a boundary of a cross section and filling in the interior space of the cross section may be automated by using a computer system. This can be achieved by taking the following steps: (j) creating an image of the object on a computer with the image including a plurality of segments defining the object; (k) generating program signals corresponding to each of the segments in a predetermined sequence; (l) activating at least one liquid droplet-ejecting channel and the powder dispensing device to dispense selected deposition materials; and (m) during this dispensing step, moving the deposition sub-system and the object work surface in response to the programmed signals relative to one another in the X-Y plane and in the Z-direction in a predetermined sequence of movements such that the deposition materials are dispensed in free space as a plurality of segments sequentially formed so that the last dispensed segment overlies at least a portion of the preceding segment in contact therewith to thereby form the object.

As elaborated earlier, it is advantageous to deposit the peripheral zones (particularly the exterior surface) of an object with fine droplets. It is also advantageous to form a gradient-thickness shape to smooth out any otherwise staircase step between two layers. To further improve the surface finish quality of an object, the final layer is also preferably built with fine droplets. The surface finish of the bottom (first) layer of an object is very much dictated by the surface quality of the work surface and, therefore, a smooth work surface may be used if a better finish of the bottom surface is desired.

In summary, a process for making a multi-material three-dimensional object has been developed. In its broadest embodiment, but still being embraced within the present invention, such a process comprises the steps of (A) creating an image of a three-dimensional object on a computer with the image including a plurality of segments defining this object and each segment being coded with a material composition; (B) evaluating the data files representing the object to locate any un-supported feature of the object, which is followed by determining a support structure for the un-supported feature and creating a plurality of segments defining the support structure; (C) generating program signals corresponding to each of these constituent segments for both the object being built and the support structure in a predetermined sequence; (D) providing at least one material composition for the object and one composition for the support structure; (E) feeding the compositions to selected deposition channels; (F) ejecting liquid composition droplets from selected dispensing channels of a print-head onto selected spots of a work surface and dispensing selected powder particles from a powder-delivery device onto a heat source-maintained weld pool on the work surface; (G) during this dispensing step, moving the deposition sub-system, comprising the print-head and powder-delivery device, and the work surface in response to the programmed signals relative to one another in the X-Y plane and in the Z-direction in a predetermined sequence of movements such that the materials are deposited in free space as a plurality of segments sequentially formed so that the last dispensed segment overlies at least a portion of the preceding segment in contact therewith to thereby form the support structure and the three-dimensional object.

What is claimed is:

1. Solid freeform fabrication apparatus for making a three-dimensional object, comprising:
   (a) a work surface;
   (b) a material deposition sub-system, disposed above and in working proximity to said work surface, comprising:
      a liquid droplet deposition device comprising (1) a multiplicity of flow channels with each channel being supplied with a solidifiable liquid composition, (2) at least one nozzle having, on one end, a fluid passage in flow communication with one of said multiple channels and, on another end, a discharge orifice of a predetermined size, and (3) actuator means located in control relation to said channels for activating ejection of droplets through said discharge orifice;
      a focused heat source disposed in working proximity to said work surface and operative to produce a heat-affected zone on said work surface;
      a powder-dispensing device, disposed in close proximity to said liquid droplet deposition device, comprising (1) at least a flow channel being supplied with solid powder particles, (2) at least one nozzle having, on one end, a flow passage in flow communication with said flow channel and, on another end, a discharge orifice of a predetermined size, and (3) valve means located in control relation with said flow channel and operative to inject solid powder particles to said heat-affected zone for forming a weld pool of molten material;
   (c) motion devices coupled to said work surface and said material deposition sub-system for moving said deposition sub-system and said work surface relative to one another in a plane defined by first and second directions and in a third direction orthogonal to said plane to form said liquid droplets and weld pool material, collectively referred to as deposition materials, into a three-dimensional shape.

2. Apparatus as set forth in claim 1, wherein said focused heat source comprises a laser beam.

3. Apparatus as set forth in claim 1, wherein said liquid droplet deposition device comprises an ink jet print-head.

4. Apparatus as set forth in claim 1, wherein said multiplicity of channels are embodied in a plurality of separate droplet deposition devices with each of said devices having at least a channel being supplied with a liquid composition from a liquid reservoir through a pipe means.

5. Apparatus as set forth in claim 1, further comprising:
   a computer-aided design computer and supporting software programs operative to create a three-dimensional image of a desired object, to convert said image into a plurality of segments defining the object, and to generate programmed signals corresponding to each of said segments in a predetermined sequence; and
   a three-dimensional machine controller electronically linked to said computer and said motion devices and operative to actuate said motion devices in response to said programmed signals for each of said segments received from said computer.

6. Apparatus as set forth in claim 5, wherein said supporting software programs comprises:
   means for evaluating the data files representing the image of said object to locate any un-supported feature of the object;
   means, responsive to the evaluating means locating an un-supported feature, for defining a support structure for said un-supported feature;
   means for creating a plurality of segments defining said support structure; and
   means for generating programmed signals required by said material deposition sub-system to fabricate said support structure.

7. Apparatus as set forth in claim 5, further comprising:
   sensor means electronically linked to said computer and operative to periodically provide layer dimension data to said computer;
   supporting software programs in said computer operative to perform adaptive layer slicing to periodically create a new set of layer data comprising segments defining the object in accordance with said layer dimension data acquired by said sensor means, and to generate programmed signals corresponding to each of said segments in a predetermined sequence.

8. Apparatus as set forth in claim 1 wherein said powder-dispensing device comprises a multi-channel pneumatic plug-phase delivery device comprising:
   multiple powder-supplying chambers;
   pipe means in flow communication with said chambers to receive plugs of powder material therefrom;
   a supply of compressed air and valve means in control relation to said chambers and said pipe means to create said plugs of material on demand in said pipe means;
   a dispensing nozzle having, on one end, a flow passage in flow communication with said pipe means and, on another end, a discharge orifice of a predetermined size to dispense said powder material therethrough.

9. A solid freeform fabrication process for making a three-dimensional object comprising the steps of:
   positioning a material deposition sub-system a selected distance above a work surface;
   operating said sub-system to deposit materials onto said work surface comprising the steps of (a) operating a multiple-channel liquid droplet deposition device of said deposition sub-system for supplying and ejecting multiple liquid compositions in a droplet form on demand onto selected spots of said work surface; (b) operating a focused heat source to produce a heat-affected zone on said work surface; and (c) operating a solid powder-dispensing device for discharging selected powder particles to said heat-affected zone for forming a molten weld pool of a predetermined size; said (a), (b), and (c) steps being operated in a predetermined sequence;
   during said material deposition process, moving said deposition sub-system and said work surface relative to one another in a plane defined by first and second directions and in a third direction orthogonal to said plane to form said liquid droplets and weld pool material into a three dimensional shape.

10. A process as set forth in claim 9, wherein the moving step includes the steps of:
   moving said deposition sub-system and said work surface relative to one another in a direction parallel to said plane to form a first layer of said liquid droplets and weld pool materials on said work surface; said droplets and said weld pool materials being hereinafter collectively referred to as deposition materials;
   moving said material deposition sub-system and said work surface away from one another in said third direction by a predetermined layer thickness; and
   after the portion of said first layer adjacent to said deposition sub-system has substantially solidified, dispensing and depositing a second layer of said deposition materials onto said first layer while simultaneously moving said work surface and said deposition sub-system relative to one another in a direction parallel to said plane, whereby said second layer solidifies and adheres to said first layer.

11. A process as set forth in claim 10, comprising additional steps of forming multiple layers of said deposition materials on top of one another by repeated dispensing and depositing of said deposition materials from said deposition sub-system as said work surface and said deposition sub-system are moved relative to one another in a direction parallel to said plane, with said deposition sub-system and said work surface being moved away from one another in said third direction by a predetermined layer thickness after each preceding layer has been formed and with the depositing of each successive layer being controlled to take place after said deposition materials in the preceding layer immediately adjacent said deposition sub-system have substantially solidified.

12. A process as set forth in claim 9, further comprising the steps of:
   creating an image of said three-dimensional object on a computer with said image including a plurality of segments defining the object;
   generating programmed signals corresponding to each of said segments in a predetermined sequence; and
   moving said deposition sub-system and said work surface relative to each other in response to said programmed signals.

13. A process as set forth in claim 9, further comprising the steps of:
   creating an image of said three-dimensional object on a computer with said image including a plurality of segments defining the object; each of said segments being coded with a selected material composition corresponding to one or more types of material combined at a predetermined proportion;
   generating programmed signals corresponding to each of said segments in a predetermined sequence;
   operating said material deposition sub-system in response to said programmed signals to selectively dispense and deposit said selected deposition materials;
   moving said deposition sub-system and said work surface relative to one another in response to said programmed signals.

14. A process as set forth in claim 9, wherein said moving step includes the step of moving said deposition sub-system and said work surface relative to one another in a direction parallel to said plane according to a first predetermined pattern to form an outer boundary from selected liquid compositions on said work surface, said outer boundary defining an exterior surface of said object.

15. A process as set forth in claim 14, wherein said outer boundary defines an interior space in said object, and said moving step further includes the step of moving said deposition sub-system and said work surface relative to one another in one direction parallel to said plane according to at least one other predetermined pattern to fill said interior space with selected deposition materials.

16. A process as set forth in claim 15, further comprising the steps of:
   creating an image of said three-dimensional object on a computer, said image including a plurality of segments defining said object; and
   generating program signals corresponding to each of said segments in a predetermined sequence, wherein said program signals determine said movement of said deposition sub-system and said work surface relative to one another in said first predetermined pattern and said at least one other predetermined pattern.

17. A process as set forth in claim 15 wherein said interior space is deposited with a spatially controlled material composition comprising two or more distinct types of materials.

18. A process as set forth in claim 17 wherein said interior space is deposited with a material composition in continuously varying concentrations of distinct materials in three-dimensional part space to form a spatially controlled material composition part.

19. A process as set forth in claim 17 wherein said distinct types of materials are deposited at discrete locations in three-dimensional part space to form a spatially controlled material composition part.

20. A process as set forth in claim 9, further comprising:
   using dimension sensor means to periodically measure dimensions of the object being built;
   using a computer to determine the thickness and outline of individual layers of said deposition materials in accordance with a computer aided design representation of said object; said computing step comprising operating said computer to calculate a first set of logical layers with specific thickness and outline for each layer and then periodically re-calculate another set of logical layers after periodically comparing the dimension data acquired by said sensor means with said computer aided design representation in an adaptive manner.

21. A process as set forth in claim 9, further comprising the steps of:
   creating an image of said three-dimensional object on a computer with said image including a plurality of segments defining the object;
   evaluating the data files representing said object to locate any un-supported feature of the object and, responsive to said evaluation step, determining a support structure for the un-supported feature and creating a plurality of segments defining said support structure;
   generating program signals corresponding to each of said segments for both said object and said support structure in a predetermined sequence;
   moving said deposition sub-system and said work surface relative to each other in response to said programmed signals for building said object and said support structure.

22. A process as set forth in claim 9, further comprising the steps of:
   creating an image of said three-dimensional object on a computer with said image including a plurality of segments defining the object;
   evaluating the data files representing said object to locate any un-supported feature of the object and, responsive to said evaluation step, determining a support structure for the un-supported feature and creating a plurality of segments defining said support structure; each of said segments for the object and the support structure being coded with a selected material composition corresponding to one or more types of material combined at a predetermined proportion;

generating programmed signals corresponding to each of said segments in a predetermined sequence;

operating said material deposition sub-system in response to said programmed signals to selectively dispense and deposit said selected deposition materials; and moving said deposition sub-system and said work surface relative to one another in response to said programmed signals for building said object and said support structure.

23. A process for making a multi-material three-dimensional object, comprising the steps of:

creating an image of said three-dimensional object on a computer, said image including a plurality of segments defining said object;

evaluating the data files representing said object to locate any un-supported feature of the object, followed by defining a support structure for the un-supported feature and creating a plurality of segments defining said support structure;

generating program signals corresponding to each of said segments for both said object and said support structure in a predetermined sequence;

providing a supply of selected liquid compositions and weld pool materials;

operating a material deposition sub-system to deposit selected materials onto a work surface; said deposition step comprising ejecting said liquid compositions in a droplet form onto desired spots of said work surface and introducing a weld pool of molten materials on said work surface;

during said deposition step, moving said deposition sub-system and said work surface in response to said programmed signals relative to one another in a plane defined by first and second directions and in a third direction orthogonal to said plane in a predetermined sequence of movements such that said deposition materials are deposited in free space as a plurality of segments sequentially formed so that the last deposited segment overlies at least a portion of the preceding segment in contact therewith to thereby form said support structure and said three-dimensional object on said work surface;

removing said support structure from said work surface.

24. A process as set forth in claim 9, wherein a peripheral zone of said object is built by depositing ejected fine droplets of selected liquid compositions.

25. A process as set forth in claim 9, wherein a staircase zone of said object is deposited with ejected fine droplets of selected liquid compositions in a gradient-thickness fashion for improved part accuracy.

26. A process as set forth in claim 12, 13, 20, 21, 22, or 23, wherein a staircase zone of said object is deposited with ejected fine droplets of selected liquid compositions in a gradient-thickness fashion for improved part accuracy.

27. A process as set forth in claim 12, 13, 20, 21, 22, or 23, wherein said object is composed of a multiplicity of layers including a first layer and a final layer and wherein the final layer of said object is built primarily with fine droplets of selected liquid compositions for improved accuracy.

28. A process as set forth in claim 12, 13, 20, 21, 22, or 23, wherein a peripheral zone of said object is built by depositing ejected fine droplets of selected liquid compositions.

* * * * *